US006408623B1

(12) United States Patent
Mollier et al.

(10) Patent No.: US 6,408,623 B1
(45) Date of Patent: Jun. 25, 2002

(54) SIMPLIFIED HYDRAULIC CONTROL DEVICE FOR A CLUTCH, ESPECIALLY FOR AN AUTOMOBILE

(75) Inventors: Christophe Mollier, Herblay; Pasquale Angione, Paris, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/762,251
(22) PCT Filed: May 31, 2000
(86) PCT No.: PCT/FR00/01520

§ 371 (c)(1),
(2), (4) Date: Feb. 5, 2001

(87) PCT Pub. No.: WO00/04989
PCT Pub. Date: Dec. 14, 2000

(30) Foreign Application Priority Data

Jun. 4, 1999 (FR) .............................................. 99 07112

(51) Int. Cl.[7] .............................. B60T 11/26; F01B 11/02
(52) U.S. Cl. ........................ 60/588; 92/170.1; 92/171.1
(58) Field of Search ........................... 60/588; 92/169.1, 92/170.1, 171.1

(56) References Cited

U.S. PATENT DOCUMENTS

| 3,266,383 A | * | 8/1966 | Cairns .................... 92/170.1 X |
| 4,510,752 A | * | 4/1985 | Gaiser .................... 92/170.1 X |
| 4,527,395 A | * | 7/1985 | Gaiser et al. ............. 60/589 X |
| 4,945,729 A | * | 8/1990 | Hayashida et al. ........ 60/588 X |
| 4,989,498 A | * | 2/1991 | Mori et al. ............... 92/169 X |
| 5,063,743 A | * | 11/1991 | Mori et al. ............. 92/171.1 X |
| 5,121,686 A | * | 6/1992 | Schonlau et al. ......... 60/588 X |
| 5,142,965 A | * | 9/1992 | Zander .................. 92/170.1 X |
| 5,187,934 A | * | 2/1993 | Mori ........................ 60/588 X |
| 5,243,823 A | * | 9/1993 | Jordan et al. ............. 92/169.1 |
| 6,289,790 B1 | * | 9/2001 | Rey .......................... 92/170.1 |

FOREIGN PATENT DOCUMENTS

| DE | 3817206 | 11/1989 |
| DE | 19523217 | 1/1997 |

* cited by examiner

Primary Examiner—John E. Ryznic
(74) Attorney, Agent, or Firm—Liniak, Berenato, Longacre & White

(57) ABSTRACT

The invention relates to a device (10) comprising a cylinder body (17) in an inner bore hole (22) in which a piston (21, 42) is mounted in such a way that it can slide axially, whereby the cylinder body (17) comprises at least one part in the front of the blind hole (17a) and one center part bearing a sealing joint, whereby both parts are fitted axially and consecutively from front to back and are interfixed in a sealed manner. Said inner bore hole comprises two front and rear sections which are substantially coaxial and concentric and are used to guide the piston (21,42) in an axially sliding manner. The invention is characterized in that both front (62) and rear (60) sections which are used to guide the piston (21,42) in a sliding manner belong to the center part (17B, 64) of the cylinder body.

21 Claims, 3 Drawing Sheets

SIMPLIFIED HYDRAULIC CONTROL DEVICE FOR A CLUTCH, ESPECIALLY FOR AN AUTOMOBILE

This invention relates to hydraulic control apparatus for a clutch, especially for a motor vehicle, including at least one emitter or receiver cylinder having a piston.

More particularly, the invention relates to hydraulic control apparatus of the type described in French patent application No. 99 02426, for a motor vehicle clutch, and of the type in which the cylinder body includes, arranged in consecutive axial succession from front to rear, at least one blind front part which includes the said base portion, and a central part which carries the said at least one sealing ring, the said parts being fixed together sealingly, and of the type in which the said internal bore includes two portions for guiding the piston in axial sliding movement, namely a front portion and a rear portion substantially coaxial and concentric with each other.

In that document, the cylinder body is in three parts, namely a front part, a central part and a rear part respectively, which are moulded, in particular in plastics material, and the two portions whereby the piston is guided in axial sliding movement in the internal bore of the cylinder body are formed by precision moulding in the front part and in the rear part respectively.

Apart from the manufacturing costs that result from manufacture of the front and rear parts, in which precision is important for the production of the guide portions for axial sliding movement of the piston, this design is also complicated and expensive because the assembly and fastening of the front and rear parts on the central part must be carried out to an equally high degree of accuracy in order to ensure that the front and rear portions that guide the piston in axial sliding movement are properly coaxial and concentric.

In order to overcome these drawbacks, and particularly in order to reduce even more the manufacturing and quantity production assembly costs, the invention proposes a control apparatus of the type mentioned above, characterised in that the front portion and rear portion for guiding the piston in sliding movement are comprised in the central part of the cylinder body.

According to further features of the invention:

the rear guide portion is formed directly in the central part of the cylinder body, and the front guide portion is formed in an internal central guide sleeve attached in the central part;

the central part and the guide sleeve include means for positioning and centring the sleeve with respect to the central part so as to ensure that the front guide portion and rear guide portion are coaxial and concentric with each other;

the means for positioning and centring the sleeve with respect to the central part comprise a cylindrical centring surface and a radially oriented transverse axial positioning face of the centring sleeve, cooperating with a complementary cylindrical centring surface and a radially oriented transverse axial positioning face of the central part;

the centring sleeve is attached in the central part by axial introduction from front to rear;

the cylindrical centring surface of the centring sleeve is a convex surface, and the radially oriented axial positioning transverse face of the centring sleeve is oriented axially towards the rear;

the central part has a stepped internal bore which comprises at least one rear portion of smaller diameter, constituting the said rear portion for guiding the piston in sliding movement, and at least one front portion, the internal surface of which constitutes the concave cylindrical centring surface of the central part;

the said at least one sealing ring is interposed axially between a radially oriented transverse face of the central part, and a radially oriented transverse rear end face of the centring sleeve;

the said at least one sealing ring is mounted in an intermediate portion of the stepped bore which is delimited axially, with respect to the said rear portion having the smaller diameter, by a shoulder that constitutes the said radially oriented transverse face of the central part;

the apparatus has two sealing rings, namely a front ring and a rear ring, which are interposed axially between the said radially oriented rear transverse face of the central part and the said transverse front end face of the guide sleeve, with a spacer being interposed between the two sealing rings;

the cylinder body comprises a front part, which is open axially towards the rear and is fixed to the rear of the central part;

the rear part is formed integrally and in one piece with the central part;

the rear part is fixed on the rear portion of the central part by resilient insertion;

the central part is moulded in plastics material;

the guide sleeve is moulded in plastics material;

the front part and central part are welded together sealingly by indirect heating;

the centring sleeve and the central part are welded together by indirect heating;

the central part of the cylinder body is configured as a transverse plate for fastening the control apparatus;

the rear end of the cylinder body includes at least one abutment adapted to cooperate with a rear end of the piston, for limiting axial rearward displacement of the piston;

the piston includes a peripheral piston jacket of metal, which is fixed axially to the piston and which slides axially in the internal bore of the cylinder body.

Further features and advantages of the invention will appear on a reading of the following detailed description, for an understanding of which, reference will be made to the attached drawings, in which.

In the following description, those elements which are identical, similar or analogous will be designated by the same reference signs.

Figure 1:
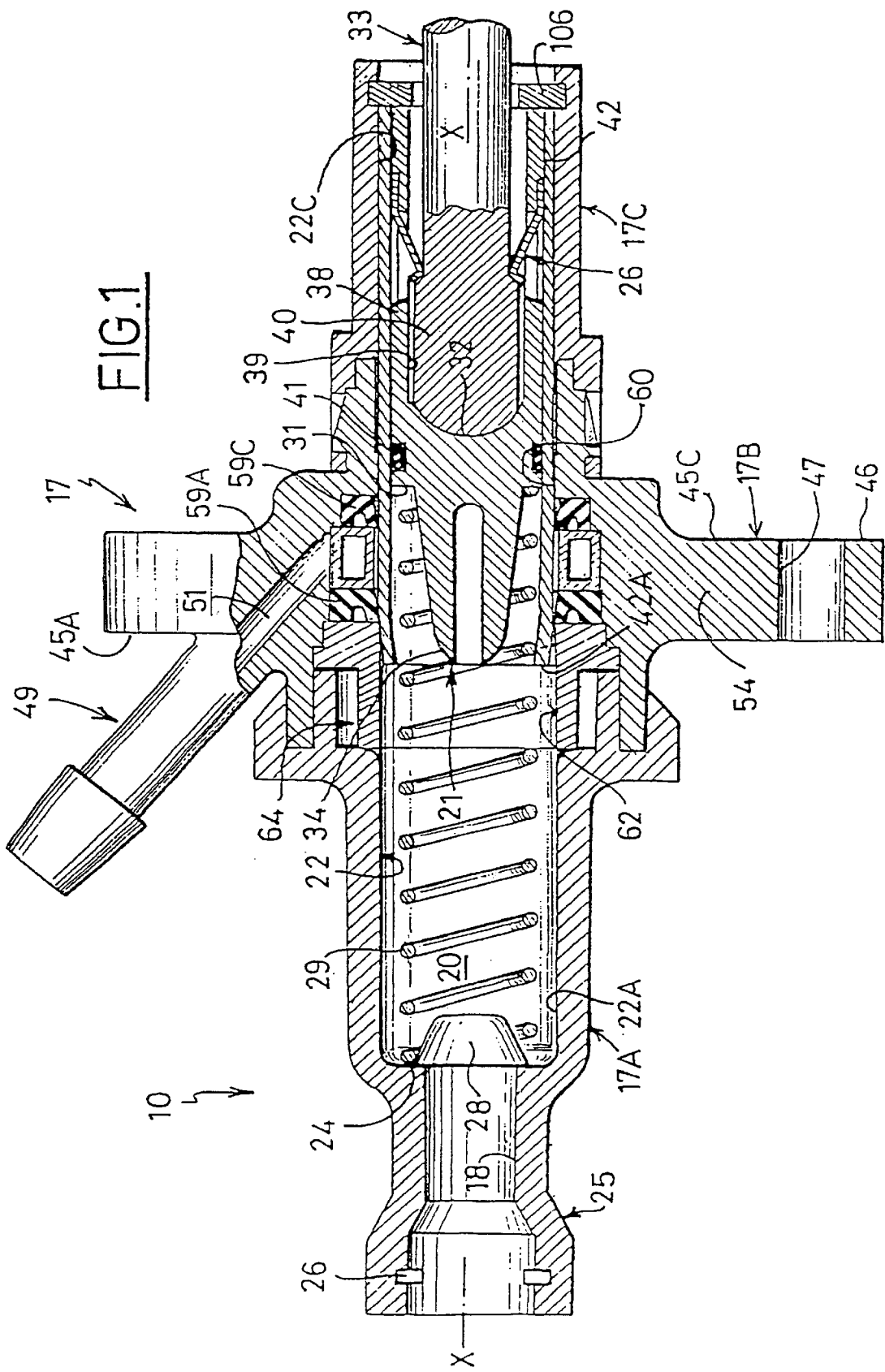
FIG. 1 is a view in longitudinal axial cross section of a first embodiment of an emitter cylinder made in accordance with the main features of the invention, and in which the piston is shown in a retracted position.
Figure 2:
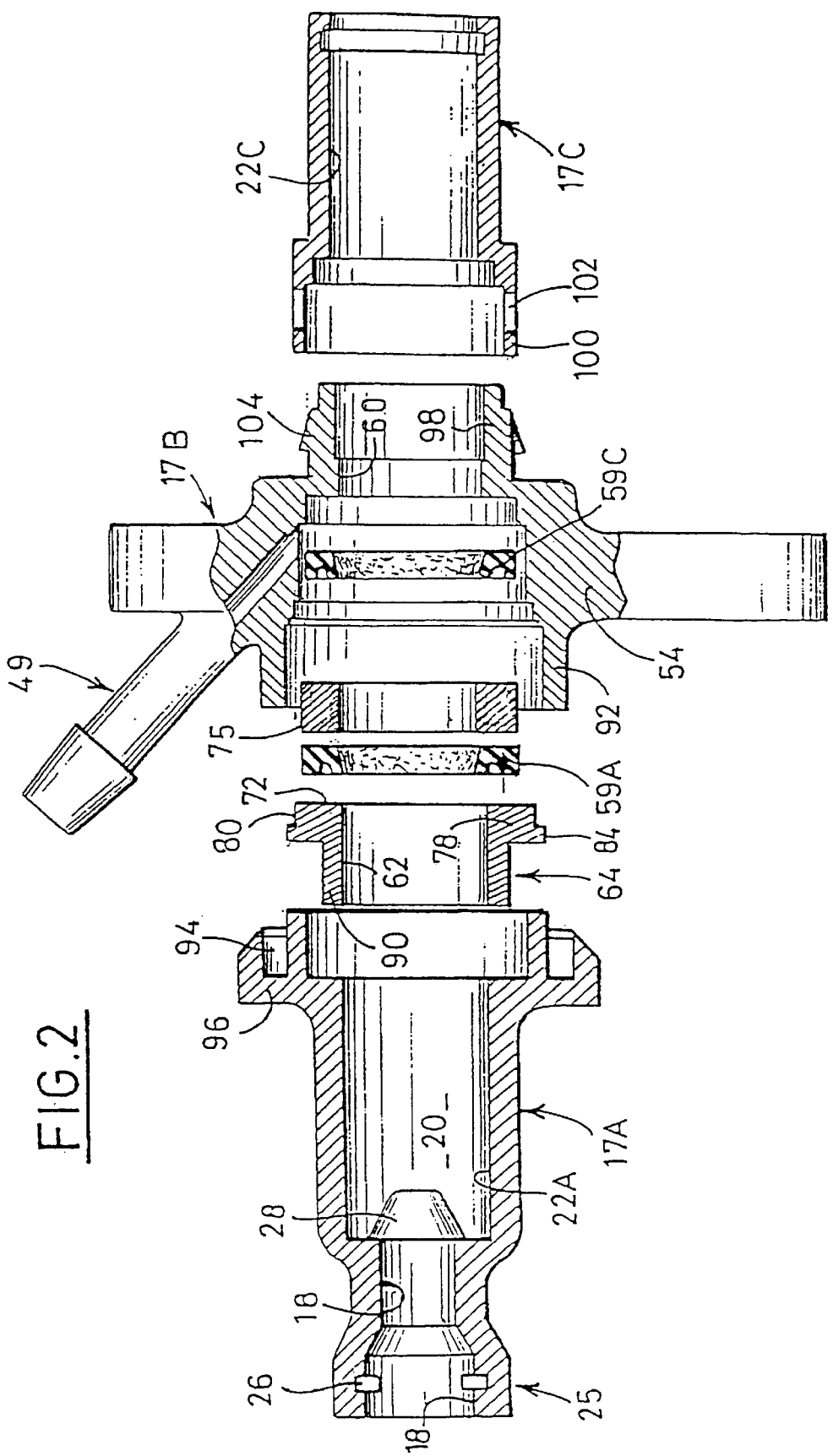
FIG. 2 is an exploded view in longitudinal axial cross section, of the components of the emitter cylinder shown in FIG. 1, except for the spring and piston.

FIGS. 1 and 2 show a control cylinder in the form of an emitter for a control apparatus for a motor vehicle clutch.

Such an apparatus (not shown) comprises an emitter cylinder which is connected through a duct to a receiver cylinder the structure of which is similar to the emitter cylinder.

Each cylinder, receiver or emitter, has a piston which is movable axially inside a cylinder body to define a variable volume hydraulic chamber. A connecting orifice, on which the duct is connected, is open into the hydraulic chamber.

The emitter cylinder includes a piston rod which is connected for example to a clutch pedal on which the driver acts, or an actuator which is brought into action in accordance with predetermined programmes.

The piston of the emitter cylinder is arranged to expel a fluid such as oil, which is contained in the hydraulic chamber, towards the pipe or duct that connects the emitter cylinder with the receiver cylinder.

When the clutch is engaged, the volume of the hydraulic chamber of the emitter cylinder is at a maximum, while the volume of the control chamber of the receiver cylinder is at a minimum.

During the declutching operation, the volume of the hydraulic chamber of the emitter cylinder becomes reduced, while the volume of the control chamber of the receiver cylinder increases.

The piston of then receiver cylinder then acts on a rod which acts for example on the declutching fork that actuates the clutch release bearing which is part of the friction clutch.

In the case where the said release bearing is of the hydraulic type, the piston of the receiver cylinder acts on a rod which acts directly on the release bearing.

Each of the emitter and receiver cylinders includes a spring which acts between the piston and the base of the body of the cylinder.

This spring may be omitted from the hydraulic control system when the pedal already itself includes such a spring device.

When the driver releases his action on the clutch pedal, or when the actuator reverts to its initial clutch engaging position, the return spring of the emitter cylinder expands so as to return the piston to its initial position, while the return spring of the emitter cylinder is compressed by the clutch engaging spring, such as a diaphragm, which thereby returns the piston of the receiver cylinder to its initial position.

In the drawings, the emitter cylinder 10 is shown in the position in which it is delivered for assembly, and it comprises a cylinder body 17 having an inlet orifice 18 which is arranged to be closed by a plug not shown. It is through this inlet orifice that the duct or pipe (not shown) that connects the receiver cylinder (not shown) to the emitter cylinder 10 is open into the hydraulic chamber 20 of the emitter cylinder.

The volume of the chamber 20 is variable, and it is bounded by the body 17 and the piston 21 which is mounted for axial movement within the cylinder body 17.

The cylinder body 17 is of generally tubular form, and in this example it consists of three distinct parts formed separately by moulding in plastics materials and disposed axially from front to rear, that is to say from left to right with reference to the drawings, and which comprise a front part 17A including the orifice 18 at its front axial end, a central or intermediate part 17B and a rear part 17C.

The cylinder body 17 consisting of the three parts 17A, 7B and 17C has an internal bore 22 of generally blind form on an axis X—X corresponding to the general axis of symmetry of the cylinder body 17, with a transversely oriented front base portion 24 into which the input orifice 18 is open, the latter being part of a connection 25 to which the duct mentioned earlier is connected, for example by clipping, the connection 25 having for this purpose internal passages 25 for receiving a clip for fastening the duct to the emitter cylinder. In another version, the connection may be of a screw type.

The cylinder body 17 is generally open at the rear, that is to say its rear part 17C is itself open towards the rear.

Each of the two axial end pieces, that is to say the front part 17A and the rear part 17C, is in the general form of a tubular member of generally simple design easy to make by moulding in plastics material.

The internal bore 22 has a front portion 22A of constant diameter formed in the front part 17A, with a stepped central portion being formed in the central part 17B and a rear portion 22C of constant diameter being formed in the rear part 17C.

The piston 21 is able to slide in the cylinder body 17, and more precisely in the internal bore 22 of the latter, forward from the retracted, clutch disengaged, position shown in FIG. 1 towards a deployed, clutch engaged, position (not shown). A generally frusto-conical projecting element 28 is formed integrally with the transverse base portion 24 and extends axially rearwards in the bore 22, so as to constitute a centre for a return spring 29, which in this example is a helical spring interposed between the cylinder body 17 and the piston 21, and more precisely between the transverse base portion 24 and the front end of the piston 21.

The orifice 18 does of course extend through the base portion 24, and is open laterally with respect to the projecting element 28 which is formed integrally by moulding with the base portion 24.

The body of the piston 21 is a member which is moulded in plastics material and is generally tubular in form, and at its front end it has a transverse wall 30, the front transverse face of which defines the axial rear end of the hydraulic chamber 20, while a front face 32 of the wall is in cooperation with the head of a piston rod 33.

The body of the piston 21 is extended axially forward from its front face 30 by a chimney portion 34 which has a frusto-conical external profile.

The helical return spring 29 is mounted around the chimney 34, the base of which centres the return spring 29, the rear axial end of which bears on the front face 31 of the cross wall 30 of the piston 21.

The spring 29 is therefore interposed axially between the base portion 24 and the front face 31.

The rear axial transverse end face 36 of the projecting element 28 may constitute an abutment with which the front axial transverse end face 37 of the chimney 34 can cooperate.

More precisely, in the advanced position the piston 21 comes into contact through the front face of the chimney 34 with the face 36 of the projecting element 28, the cylinder body 17 thus having an abutment 28 which limits the axial forward displacement of the piston 21.

The tubular body of the piston 21 of plastics material is extended axially towards the rear from the transverse wall 30 by a sleeve portion 38 having a bore 39, the front base of which is delimited by the rear face 32 of the transverse wall 30 of the piston 21.

The base 32 of the bore 39 is of generally hemispherical form, so as to receive the complementary head 40 formed at the front axial end of the piston rod 33.

The head 40, and therefore the piston rod 33, is retained axially within the bore 39, and therefore with respect to the piston 21, by an elastically deformable element 26 which will not be described here in any greater detail.

The rod 33 is thereby mounted rotatably in the piston 21, and more precisely with respect to the base 32 of the sleeve portion 38.

The piston 21 carries at its cylindrical outer periphery a static piston sealing ring 41, which in this example is an O-ring mounted in an internal radial groove formed in the cylindrical outer periphery in line with the transverse wall 30. Other forms of static sealing rings may be envisaged.

The static seal 41 is arranged to cooperate with the cylindrical internal peripheral surface of a piston jacket 42 which in this example is of metal.

The piston jacket 42 is a tubular element which surrounds the piston 21, which is received within the jacket 42.

The piston jacket 42 is made for example of anodised aluminium or treated steel. The piston jacket 42 extends forward in axial projection with respect to the chimney 34, in such a way that, in the advanced position which is not shown, the chimney 34 is in contact with the projecting element 28, while the transverse front terminal edge 42A is spaced axially away from the transverse base portion 24 which is in facing relationship with it. The dimensions of the piston jacket 42 are such that the chimney 34 and the return spring 29 are received radially, with a clearance, within the piston jacket 42.

The piston jacket 42 is in intimate contact at its cylindrical outer periphery with the cylindrical outer periphery of the piston 21 and with the outer periphery of the static sealing ring 41.

The piston jacket 42 is fixed axially to the piston 21, partly by a radial gripping effect between the piston 21 and piston jacket 42 with cooperation of the static sealing ring 41.

Other means for connecting the piston 21 axially and in rotation to the piston jacket 42 may be envisaged without departing from the scope of the invention.

In all cases, there is thus provided a unitary sub-assembly consisting of the piston 21 and piston jacket 42, constituting a moving part which moves axially in the internal bore 22 of the cylinder body 17, the piston jacket 42 and the piston 21 being concentric and coaxial on the axis X—X.

The cylinder body is arranged to be fixed on a fixed part of the vehicle, and is accordingly part of the generally fixed part of the emitter cylinder 10, while the piston 21 with its piston rod 33 is part of the moving part of the emitter cylinder.

In this connection, the central portion 17B of the cylinder body 17 is made in the form of an intermediate plate which is disposed axially between the front part 17A and the rear part 17C of the body 17.

The plate 17B lies transversely in a radially oriented plane at right angles to the axis X—X.

The central part 17B, constituting a fastening plate, is moulded in plastics material, and it may for example include fastening ears 46 having holes 47 for the passage of fastening members, typically screws, for fastening the cylinder body 17, and therefore the emitter cylinder 10, on a fixed part of the motor vehicle.

FIG. 1 further shows a tube 49 which is fixed to the central part 17B of the cylinder body 17.

The tube 49 enables the interior of the cylinder body 17 to be connected to a main feed reservoir (not shown) which is mounted on the outside of the cylinder body 10, the hydraulic chambers of the emitter and receiyer cylinders being filled with a hydraulic fluid, such as oil for example.

The reservoir is partially filled with hydraulic fluid, and it is connected through a duct, not shown in the drawings, to the tube 49, this latter exhausting into a passage 51 which has an orientation inclined with respect to the axis X—X and which extends through the central part 17B from its front transverse face 45A, to exhaust towards the rear and axially within the stacked central bore 22B formed in the solid central portion 54, which is generally annular and cylindrical in form, of the central part 17B.

The means in accordance with the invention for guiding the piston 21 in sliding movement in the cylinder body 17 will now be described with reference to FIGS. 1 to 3.

In accordance with the features of the invention, the means for guiding the piston 21, 42 in axial sliding movement in the internal bore 22 of the cylinder body comprise two guide portions 60 and 62, which are a rear guide portion and a front guide portion respectively, each of which is a section of a cylinder on the general axis X—X, and both of which are part of the central part 17B of the cylinder body 17.

More precisely, the front guide portion 62 is part of a guide ring 64 attached on the central part 17B, while the rear guide portion 60 is formed directly in the central part which here, by way of example, is formed by precision moulding in plastics material.

Figure 3:
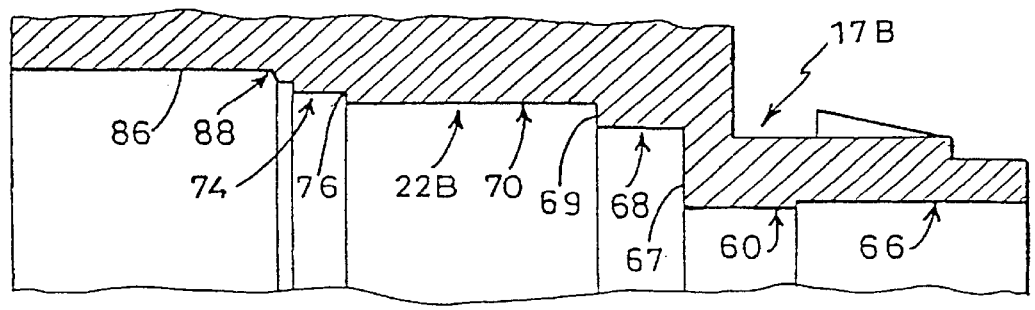
FIG. 3 is a detailed view on an enlarged scale, showing the stepped internal bore of the central part of the cylinder body.

As can be seen in detail in FIG. 3, the portion of the central bore 22B formed in the solid portion 54 of the central part is a stepped bore portion.

More precisely, considered from the rear towards the front, that is to say from right to left in FIG. 3, the stepped central bore 22B comprises a rear portion 60 of smaller diameter, which is a convex precision-made cylindrical surface that constitutes the rear guide portion and is extended axially towards the rear by a relief 66, the diameter of which is slightly greater, and in which dimensional precision is functionally unimportant.

Towards the front, beyond the rear guide portion 60, the stepped bore 22B comprises, in succession, a portion 68 of larger diameter and without dimensional precision, which constitutes the seating for a first or rear sealing ring 59C, and then another portion 70 of larger diameter, without dimensional precision, which constitutes the seating for a second or front sealing ring 59A, with an interposed axial spacer 75, which is for example of rectangular cross section and which may be hollow, and then a portion of larger diameter 74, which is a concave cylindrical surface for centring the guide sleeve 64 and which is bounded axially at the front, with respect to the preceding portion 70, by a transverse shoulder 76 which lies in a radial plane and is oriented axially towards the front.

The portions 60 and 68 are delimited by a radial shoulder 67 oriented towards the front, while the portions 68 and 70 are delimited by a shoulder 69.

In a complementary manner, the solid rear axial end portion 78 of the guide ring 64 is bounded radially on the outside by a convex cylindrical bearing surface 80, the diameter of which is complementary to the internal diameter of the portion 74, and which is delimited axially by a rear transverse end face 82 which is in axial abutment at the rear against the shoulder 76.

For fastening of the solid portion 78 of the guide sleeve 64 in its assembled position, for example by welding, in the stepped bore 22B of the central part 17B, the portion 78 further includes an external radial collar portion 84 which is received in a final, front, terminal portion 86, of larger diameter, in the stepped bore 22B, which is joined to the preceding portion 74 by a connecting zone 88 configured in a particular way so as to facilitate the welding operations (see FIG. 3).

Beyond its solid rear portion 78, the guide sleeve 64 is extended axially by a tubular portion 90 of greater axial length, so as to define a long rear guide portion 62.

When fitted and secured, for example by welding, the guide sleeve 64, which is precision moulded in plastics material, is perfectly positioned axially, and is centred in the central part 17B in such a way as to ensure that the rear guide portion 60 and front guide portion 62 for the piston 21 are perfectly coaxial and perfectly concentric with each other.

In addition, fitting and fastening of the guide sleeve 64 in the stepped bore 88B of the central part 17B, by trapping the two seals, namely the front seal 59A and rear seal 59B, axially between which the spacer 75 is interposed, constitutes the provision of a complex seal in the solid central portion 54 of the central part 17B.

Each of the dynamic seals, namely the front seal 59A and rear seal 59B is, in this example, in the form of a lipped cup seal, which is mounted in a complementary seating 68, 70 formed in the solid central portion 54 of the central part 17B, and which is open radially inwards in such a way that each dynamic seal 59A, 59C is able to cooperate, through its radially inward lip, with the outer cylindrical surface of the piston jacket 42. By way of modification, each dynamic seal may be a composite sealing ring.

The central part 17B thus acts by its solid central portion 54 as a complex seal which in this case carries two dynamic sealing rings, while a single dynamic sealing ring can be provided without departing from the scope of the invention.

In accordance with the features of the invention, only the central part 17B of the guide sleeve 64 needs to be made with high manufacturing precision, in particular with a view to providing two coaxial and concentric guide portions 50 and 62, while the front part 17A and rear part 17C may be made with less precision, in particular to the extent that their internal bore portions 22A and 22C do not provide guidance for the axial sliding movement of the piston 21, 42.

Assembly and fastening of the guide sleeve 64 and the central part 17B does not call for any particular sealing means, in that rearward axial sealing is ensured by the two sealing rings, and in that forward axial sealing is provided between the front part 17A and central part 17B by the interposed sealed fastening means between these two components.

In the embodiment shown in FIGS. 1 and 2, the front axial end portion 92 of the solid portion 54 is made in the form of a tubular element which is received axially in a complementary annular cylindrical seating 94 formed in the rear axial end portion 96 of the front part 17A, sealed fastening between the two parts 17A and 17B being obtained by welding the portions 92 and 94 in the zone 200, preferably, in this case, by rotary friction welding, vibration welding or laser welding.

As can be seen in FIGS. 1 and 2, the rear part 17C is of particularly simple design, and the means by which it is fastened on the rear axial end portion 98 of the central part 17B do not call for any particular sealing means, because the fastening zone of these two pieces is situated downstream of the complex seal and outside the chamber 20.

In the embodiment shown in FIGS. 1 and 2, the rear part 17C is thus secured by elastic insertion, 100, on the rear axial end portion 98 by means of holes 102 and nibs 104.

The design in accordance with the invention also has the particular advantage that it enables different components to be assembled together by axial stacking, in particular in a vertical assembly direction corresponding to the axis X—X, starting with the front part 17A, and then putting in position, in succession, the spring 29, the central part 17B, which has previously been equipped with the guide sleeve 64 so as to form a complex seal and the guide means for the piston, and then the rear part 17C, and finally the piston rod 33 with its head 40, the assembly process being completed by fitting the elastic abutment ring 106, against which the tubular rear transverse end face of the piston assembly 21, 42 engages.

Figure 4:
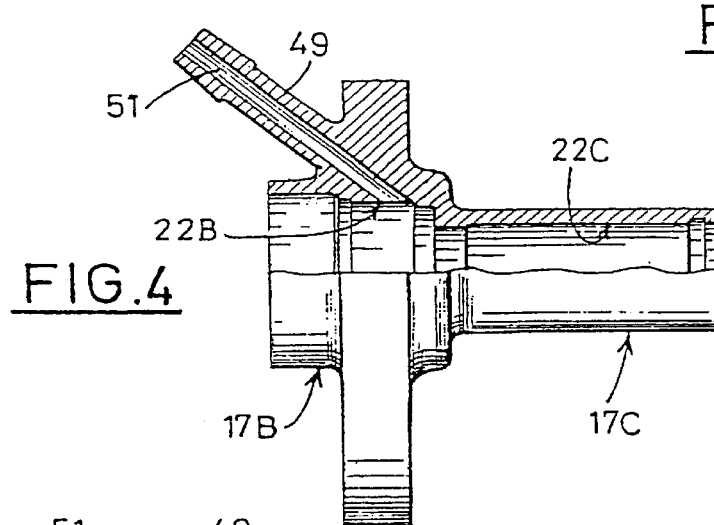
FIG. 4 is a view showing a first modified embodiment of the cylinder body according to the invention, in which the central part and the rear end part are integral with each other, being moulded in one piece.

In the modified embodiment shown in FIG. 4, it can be seen that the central part 17B and the rear part 17C are formed integrally by moulding in plastics material, in one piece, the general design and configuration from right to left of the single member shown in FIG. 4 being otherwise identical with those described above with reference to FIGS. 1 to 3.

Figures 5, 6:
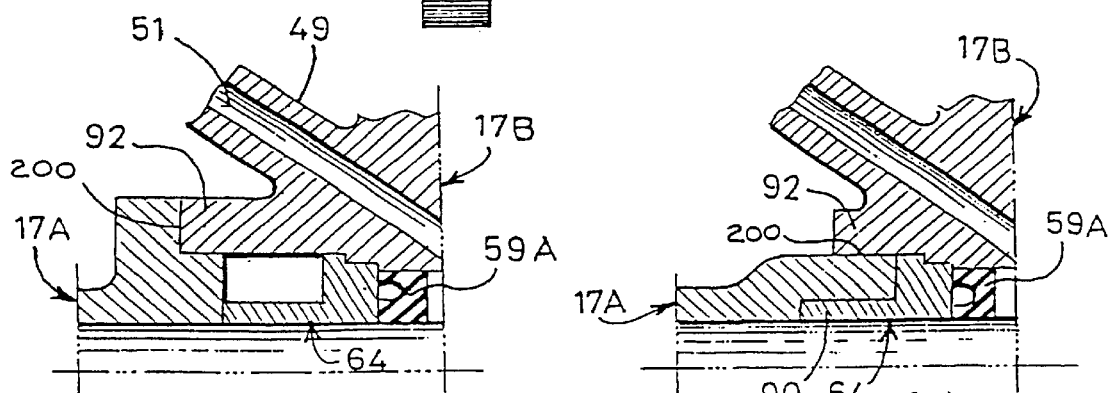
FIG. 5 is a detail view showing a modified embodiment of the sealed welded joint fastening the front. axial end part on the central part.
FIG. 6 is a view similar to that in FIG. 5, showing a further modified embodiment of the sealed joint.

In the further version shown in FIG. 5, which is more particularly adapted to the provision of a sealed fastening between the front part 17A and central part 17B by vibration welding, it can be seen that the tubular portion 92 is received in a complementary seating 94 which is open radially towards the outside, while the design of the guide sleeve 64 is unchanged.

In the further version shown in FIG. 6, which, as in the case shown in FIGS. 1 and 2, is more particularly adapted to the provision of sealed fastening between the front part 17A and central part 17B by rotary friction welding, it can be seen that it is the rear axial end portion 94 of the front part 17A that is configured as a tubular portion which is received in a complementary seating, defined firstly by the tubular insert 90 of the guide sleeve 64, and secondly by the front axial end portion 92 of the central part 17B.

Figure 7:
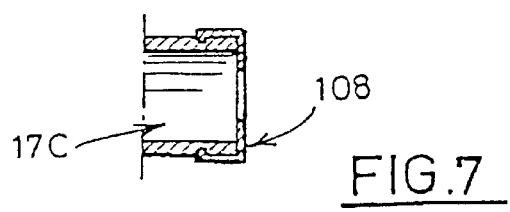
FIG. 7 is a detail view on a reduced scale, showing a modified design of the axial rear abutment means for the piston.

Finally, FIG. 7 shows a modified embodiment of the rear axial abutment means for the piston 21, 42, which in this example consist of an external cap 108 which is fitted elastically around the rear axial free end portion of the rear part 17C.

The piston jacket 42 has at least one hole or passage slot for putting the interior and exterior of the piston jacket 42 into communication with each other.

The hole is located as a function of the axial movement of the piston 21 with its piston jacket 42 on either side of the lip of the front dynamic sealing ring 59A. When the clutch is engaged, the hole puts the hydraulic control chamber 20 and the external main reservoir into communication with each other. During operation of the clutch, this communication is interrupted because the hole is displaced with respect to the seal 59A, forward with reference to FIG. 2.

Several holes can of course be provided in a common transverse plane, to enable more fluid to flow and to avoid the need to have any recourse to angular orientation during the assembly process, the holes 62 being spaced apart circumferentially at regular intervals.

Communication between the hydraulic chamber 20 and the reservoir is through these holes and the annular axial space defined between the outer cylindrical surface of the piston jacket 42 and the internal cylindrical surface of the internal bore 22A of the solid central portion 54 of the central part 17B.

In accordance with an aspect not shown in the drawings, and in order to prevent any escape of fluid to the outside, a sealing bellows may be provided between the cylinder body 17 and the piston rod 33, for example between the central part 17B and the piston rod.

The presence of two dynamic sealing rings 59A, 59C can however enable any need for a complementary sealing bellows to be avoided.

In that case there can if necessary be provided a complementary cap (not shown) for protecting the rear part 17C, which is for example fixed around the rear tubular portion 27C of the central part 17B and which surrounds the rear part 17C, with the piston rod 33 passing through it.

Such a protective cap can of course surround a sealing bellows.

What is claimed is:

1. Hydraulic control apparatus (10) for a clutch comprising at least one cylinder having a cylinder body (17) which includes a base portion (24) at a front, and which is open at the rear and has an internal bore (22) in which a piston (21, 42) is mounted for axial sliding movement, with at least one dynamic sealing ring (59A, 59C) being interposed and being carried by the body of the cylinder (17, 17B) for cooperation with an outer periphery (42) of the piston (21), in which the piston (21) has a front face (31) defining a hydraulic chamber (20) and a rear face (32) cooperating with a piston rod (33), and in which the cylinder body (17) includes, arranged in consecutive axial succession from front to rear, at least one blind front part (17A) which includes said base portion (24), and a central part (17B) which carries said at least one sealing ring, said parts being fixed together sealingly, and in which said internal bore includes two portions for guiding the piston (21, 42) in axial sliding movement, namely a front portion and a rear portion substantially coaxial and concentric with each other, wherein the front portion (62) and rear portion (60) for guiding the piston (21, 42) in sliding movement are comprised in the central part (17B, 64) of the cylinder body, and wherein a centering sleeve (64) is attached in the central part (17B, 22B) by axial introduction from front to rear.

2. Hydraulic control apparatus (10) for a clutch comprising at least one cylinder having a cylinder body (17) which includes a base portion (24) at a front, and which is open at the rear and has an internal bore (22) in which a piston (21, 42) is mounted for axial sliding movement, with at least one dynamic sealing ring (59A, 59C) being interposed and being carried by the body of the cylinder (17, 17B) for cooperation with an outer periphery (42) of the piston (21), in which the piston (21) has a front face (31) defining a hydraulic chamber (20) and a rear face (32) cooperating with a piston rod (33), and in which the cylinder body (17) includes, arranged in consecutive axial succession from front to rear, at least one blind front part (17A) which includes said base portion (24), and a central part (17B) which carries said at least one sealing ring, said parts being fixed together sealingly, and in which said internal bore includes two portions for guiding the piston (21, 42) in axial sliding movement, namely a front portion and a rear portion substantially coaxial and concentric with each other, wherein the front portion (62) and rear portion (60) for guiding the piston (21, 42) in sliding movement are comprised in the central part (17B, 64) of the cylinder body, and wherein a central guide sleeve (64) is attached in the central part (17B, 22B), said central guide sleeve is formed with a tubular portion (90) that extends from a main body of the guide sleeve to define a rear guide portion (62).

3. Hydraulic control apparatus (10) for a clutch comprising at least one cylinder having a cylinder body (17) which includes a base portion (24) at a front, and which is open at the rear and has an internal bore (22) in which a piston (21, 42) is mounted for axial sliding movement, with at least one dynamic sealing ring (59A, 59C) being interposed and being carried by the body of the cylinder (17, 17B) for cooperation with an outer periphery (42) of the piston (21), in which the piston (21) has a front face (31) defining a hydraulic chamber (20) and a rear face (32) cooperating with a piston rod (33), and in which the cylinder body (17) includes, arranged in consecutive axial succession from front to rear, at least one blind front part (17A) which includes said base portion (24), and a central part (17B) which carries said at least one sealing ring, said parts being fixed together sealingly, and in which said internal bore includes two portions for guiding the piston (21, 42) in axial sliding movement, namely a front portion and a rear portion substantially coaxial and concentric with each other, wherein the front portion (62) and rear portion (60) for guiding the piston (21, 42) in sliding movement are comprised in the central part (17B, 64) of the cylinder body, and wherein the rear guide portion (60) is formed directly in the central part (17B) of the cylinder body (17), and in that the front guide portion (62) is formed in an internal central guide sleeve (64) attached in the central part (17B).

4. Control apparatus according to the preceding claim 1, characterised in that the central part (17B) and the guide sleeve (64) include means (74, 76, 80, 82) for positioning and centring the sleeve (64) with respect to the central part (17B, 22B) so as to ensure that the front guide portion (62) and rear guide portion (60) are coaxial and concentric with each other.

5. Control apparatus according to the preceding claim 4, characterised in that the means for positioning and centring the sleeve (64) with respect to the central part (17) comprise a cylindrical centring surface (80) and a radially oriented transverse axial positioning face of the centring sleeve (64), cooperating with a complementary cylindrical centring surface (74) and a radially oriented transverse axial positioning face (76) of the central part (17B, 22B).

6. Control apparatus according to claim 5, characterised in that the centring sleeve (64) is attached in the central part (17B, 22B) by axial introduction from front to rear.

7. Apparatus according to claim 6, characterised in that the cylindrical centring surface (80) of the centring sleeve (64) is a convex surface, and in that the radially oriented axial positioning transverse face of the centring sleeve is oriented axially towards the rear.

8. Control apparatus according to the preceding claim 7, characterised in that the central part (17B) has a stepped internal bore (22B) which comprises at least one rear portion (60) of smaller diameter, constituting the said rear portion for guiding the piston in sliding movement, and at least one front portion (74), the internal surface of which constitutes the concave cylindrical centring surface of the central part (17B, 22B).

9. Apparatus according to any one of claims 8, characterised in that the said at least one sealing ring (59A, 59C) is interposed axially between a radially oriented transverse face (67) of the central part and a radially oriented transverse rear end face (82) of the centring sleeve (64).

10. Control apparatus according to claim 9, characterised in that the said at least one sealing ring (59C) is mounted in an intermediate portion (68) of the stepped bore (22B) which is delimited axially, with respect to the said rear portion (60) having the smaller diameter, by a shoulder that constitutes the said radially oriented transverse face of the central part (17B, 22B).

11. Control apparatus according to claim 10, characterised in that it has two sealing rings, namely a front ring (59A) and a rear ring (59C), which are interposed axially between the said radially oriented rear transverse face (67) of the central part (17B, 22B) and the said transverse front end face (82) of the guide sleeve (64), with a spacer (75) being interposed between the two sealing rings.

12. Control apparatus according to claim 11, characterised in that the cylinder body (17) comprises a front part (17C), which is open axially towards the rear and is fixed to the rear of the central part (17B).

13. Control apparatus according to claim 12, characterised in that the rear part (17C) is formed integrally and in one piece with the central part (17B).

14. Control apparatus according to claim 12, characterised in that the rear part (17C) is fixed on the rear portion (98) of the central part (17B) by resilient insertion (102, 104).

15. Control apparatus according to claim 14, characterised in that the central part (17B) is moulded in plastics material.

16. Control apparatus according to claim 15, characterised in that the guide sleeve (64) is moulded in plastics material.

17. Apparatus according to claim 16, characterised in that the front part (17A) and central part (17B) are welded together sealingly by indirect heating.

18. Control apparatus according to claim 17, characterised in that the centring sleeve (64) and the central part (17B) are welded together by indirect heating.

19. Control apparatus according to claim 18, characterised in that the central part (17B) of the cylinder body (17) is configured as a transverse plate for fastening the control apparatus (10).

20. Control apparatus according to claim 19, characterised in that the rear end of the cylinder body (17) includes at least one abutment (106, 108) adapted to cooperate with a rear end of the piston, for limiting axial rearward displacement of the piston (21).

21. Control apparatus according to claim 20, characterised in that the piston (21) includes a peripheral piston jacket (42) of metal, which is fixed axially to the piston and which slides axially in the internal bore of the cylinder body (17).

* * * * *